(12) United States Patent
Pejathaya (10) Patent No.: US 9,493,097 B2
(45) Date of Patent: Nov. 15, 2016

(54) TWO-POSITION, HIGH-MOUNT LATCH

(71) Applicant: Fisher & Company, Incorporated, St. Clair Shores, MI (US)

(72) Inventor: Srinivas Pejathaya, St. Clair Shores, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 14/751,346

(22) Filed: Jun. 26, 2015

(65) Prior Publication Data

US 2016/0009202 A1 Jan. 14, 2016

Related U.S. Application Data

(60) Provisional application No. 62/022,958, filed on Jul. 10, 2014.

(51) Int. Cl.
| | |
|---|---|
| *B60N 2/20* | (2006.01) |
| *B60N 2/22* | (2006.01) |
| *B60N 2/36* | (2006.01) |
| *B60N 2/30* | (2006.01) |

(52) U.S. Cl.
CPC .................................. *B60N 2/3011* (2013.01)

(58) Field of Classification Search
CPC ..................................................... B60N 2/3011
USPC ........................ 297/378.13, 378.12, 378.14
See application file for complete search history.

(56) References Cited

U.S. PATENT DOCUMENTS

| | | | |
|---|---|---|---|
| 6,733,078 B1 * | 5/2004 | Zelmanov | B60N 2/2245 297/378.13 X |
| 2004/0021357 A1 * | 2/2004 | Denning | B60N 2/3013 297/378.13 |
| 2009/0033138 A1 * | 2/2009 | Yamada | B60N 2/366 297/378.13 |
| 2013/0313395 A1 * | 11/2013 | Blake | B60N 2/01583 297/378.13 X |

\* cited by examiner

*Primary Examiner* — Rodney B White (74) *Attorney, Agent, or Firm* — Harness, Dickey & Pierce, P.L.C.

(57) ABSTRACT

A latch mechanism that selectively receives a striker is provided. The latch mechanism includes a housing having a channel and a locking mechanism having a claw rotatably supported by the housing and movable between a first locked state and a second locked state. The claw locks the striker at a first location along a length of the channel in the first locked state and locks the striker at a second location along a length of the channel different than the first location in the second locked state.

23 Claims, 7 Drawing Sheets

TWO-POSITION, HIGH-MOUNT LATCH

CROSS-REFERENCE TO RELATED APPLICATIONS

This application claims the benefit of U.S. Provisional Application No. 62/022,958, filed on Jul. 10, 2014. The entire disclosure of the above application is incorporated herein by reference.

FIELD

The present disclosure relates to a latch mechanism and, more particularly, to a latch mechanism for use with a seatback of a seat assembly that permits the seatback to be locked in two different angular positions relative to a seat bottom.

BACKGROUND

The statements in this section merely provide background information related to the present disclosure and may not constitute prior art.

Recliner mechanisms and latch mechanisms are conventionally used in conjunction with a seat assembly to permit angular adjustment of a seatback relative to a seat bottom. For example, recliner mechanisms are typically disposed at a junction of the seatback and the seat bottom to permit selective movement of the seatback relative to the seat bottom and, further, to lock the seatback in a plurality of angular positions relative to a seat bottom.

Latch mechanisms are similarly used to lock a position of a seatback relative to a seat bottom, but do not typically allow angular adjustment of a seatback relative to a seat bottom. Namely, latch mechanisms typically engage a striker that is fixedly mounted to a structure of a vehicle and, as such, lock the seatback to the striker in one angular position relative to the seat bottom. Conventional latch mechanisms, therefore, while adequately locking an angular position of a seatback relative to a seat bottom, do not allow for movement of the seatback into different angular positions relative to the seat bottom.

SUMMARY

This section provides a general summary of the disclosure, and is not a comprehensive disclosure of its full scope or all of its features.

A latch mechanism that selectively receives a striker is provided. The latch mechanism includes a housing having a channel and a locking mechanism having a claw rotatably supported by the housing and movable between a first locked state and a second locked state. The claw locks the striker at a first location along a length of the channel in the first locked state and locks the striker at a second location along a length of the channel different than the first location in the second locked state.

The latch mechanism can be incorporated into a seat assembly including a seat bottom and a seatback. The seatback may be rotatable relative to the seat bottom among a fold-flat position, a first upright position and a second upright position. The latch mechanism may be mounted to an upper portion of the seatback and may receive the striker in the first and second upright positions. In the fold-flat position, the striker is spaced apart from the latch mechanism. The seatback may be locked in the first upright position when the locking mechanism is in the first locked state. The seatback may be locked in the second upright position when the locking mechanism is in the second locked state.

In some configurations, the claw is in a first rotational position in the first locked state and a second rotational position in the second locked state.

In some configurations, the locking mechanism includes a first stop cam mounted for rotation relative to the housing and selectively restricting movement of the striker from the first location along the length of the channel to the second location along the length of the channel.

In some configurations, the locking mechanism includes a lock cam mounted for rotation relative to the housing and engaging the claw in the first locked state to restrict rotation of the claw relative to the housing.

In some configurations, the lock cam includes a locking projection that engages a first locking recess in the claw in the first locked state and engages a second locking recess in the claw in the second locked state.

In some configurations, the locking mechanism includes a tolerance-absorbing cam mounted for rotation relative to the housing and including a slot receiving a pin of the lock cam.

In some configurations, the locking mechanism includes a second cam stop mounted for rotation relative to the housing and engaging the first cam stop in the first locked state to restrict rotation of the first cam stop relative to the housing.

In some configurations, the latch mechanism includes a release lever mounted for rotation relative to the housing and engaging the tolerance-absorbing cam such that rotation of the release lever causes corresponding rotation of the tolerance-absorbing cam. Rotation of the tolerance-absorbing cam may cause rotation of the lock cam.

In some configurations, the claw and the first cam stop are rotatable about a first pivot. The lock cam and the tolerance-absorbing cam may be rotatable about a second pivot that is spaced apart from the first pivot. The second cam stop may be rotatable about a third pivot that is spaced apart from the first and second pivots.

In some configurations, the claw includes a claw channel in which the striker is received in the first locked state. The striker may be outside of the claw channel in the second locked state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
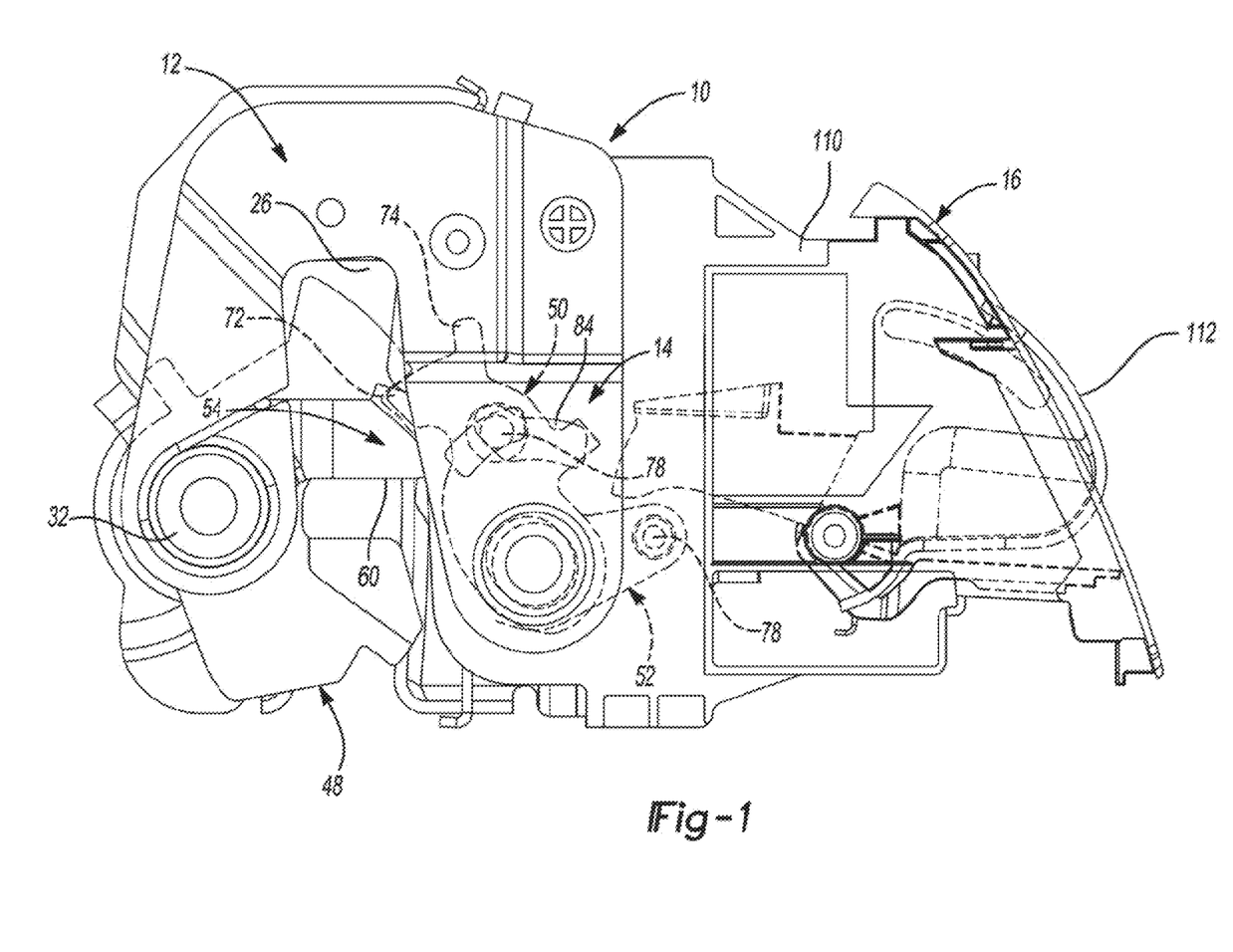
FIG. 1 is a perspective view of a latch mechanism in accordance with the principles of the present disclosure.
Figure 2:
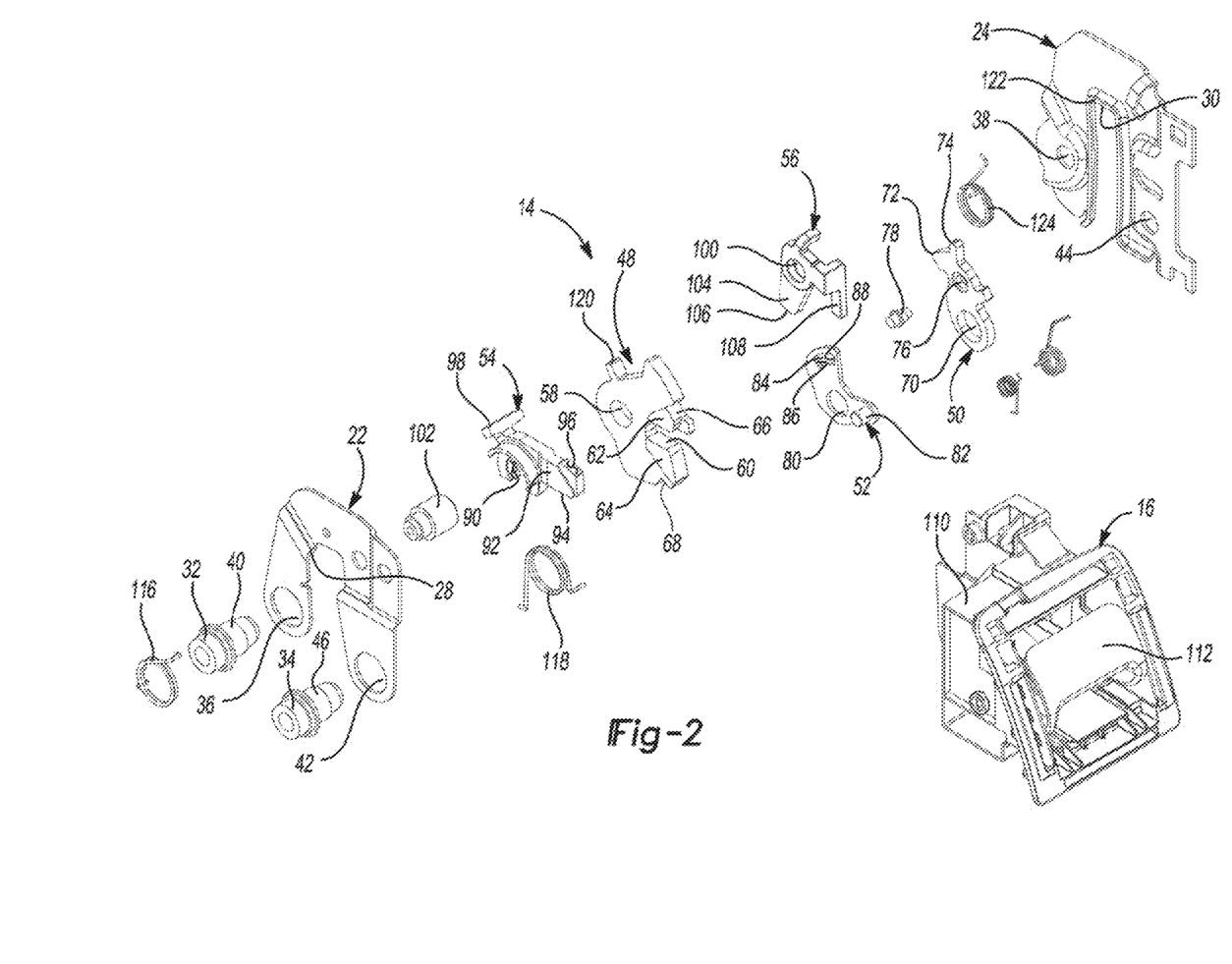
FIG. 2 is an exploded view of the latch mechanism of FIG. 1.
Figure 3:
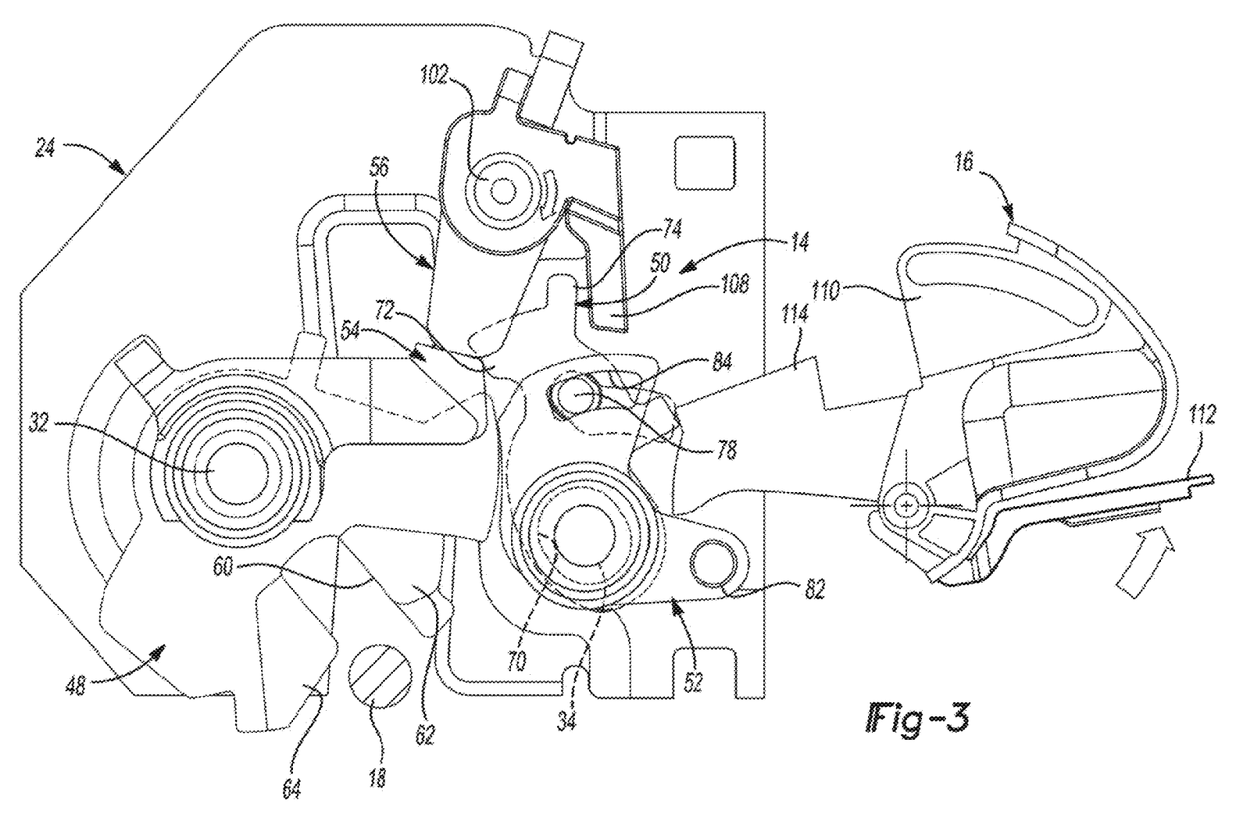
FIG. 3 is a side view of the latch mechanism of FIG. 1 with part of a housing moved to show internal components of the latch mechanism in an unlocked state.
Figure 5:
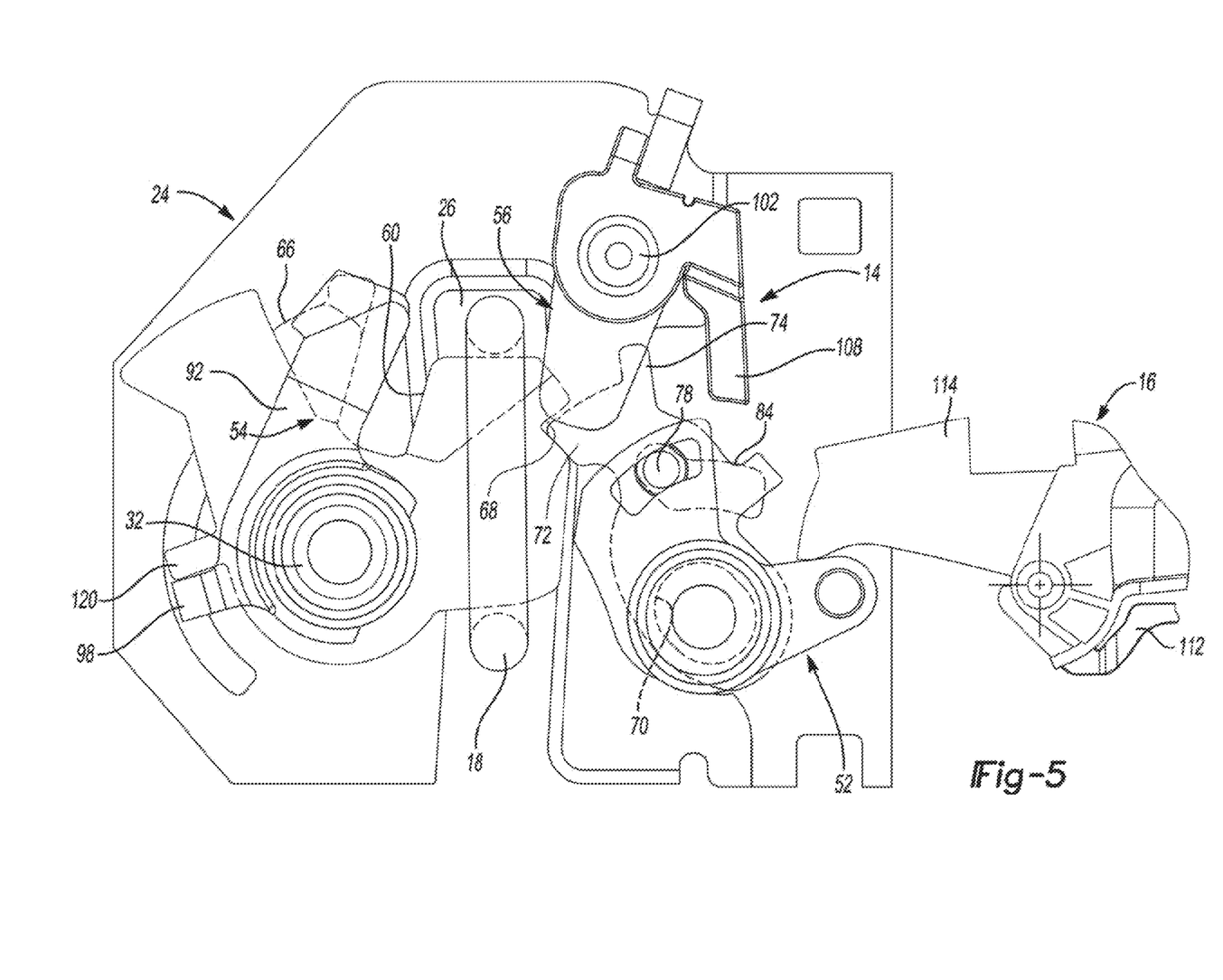
FIG. 5 is a perspective view of the latch mechanism of FIG. 1 with part of a housing removed to show internal components of the latch mechanism in a second locked state.
Figure 6:
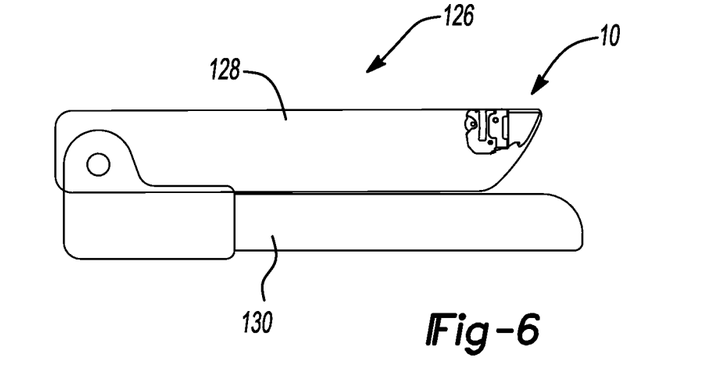
FIG. 6 is a schematic representation of a seat assembly incorporating the latch mechanism of FIG. 1 showing the seat assembly in a fold-flat position.
Figure 7:
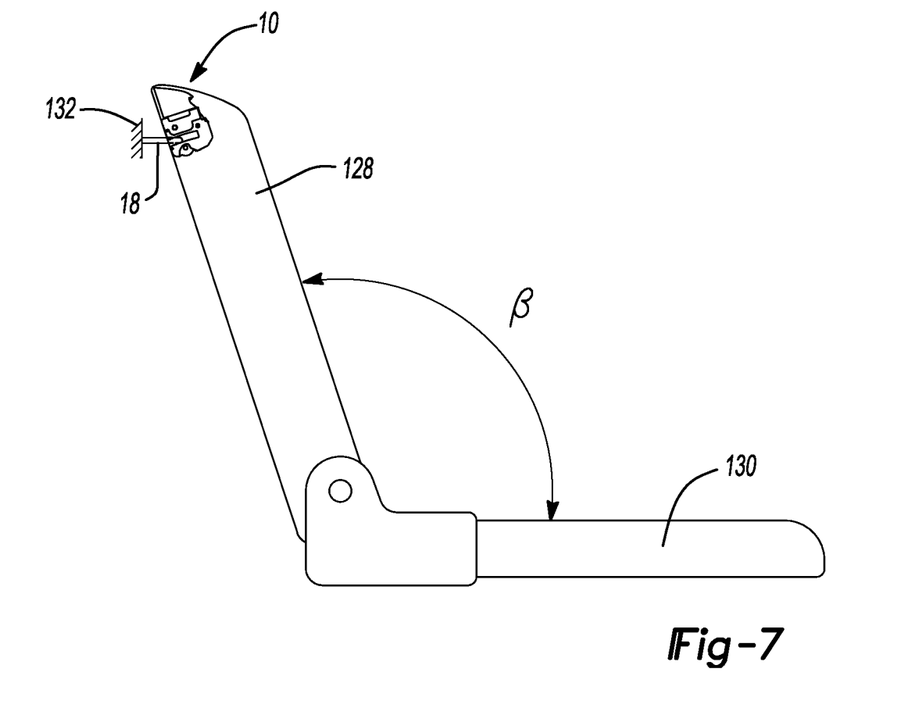
FIG. 7 is a perspective view of the seat assembly of FIG. 6 showing a seatback of the seat assembly in a first angular position relative to a seat bottom.
Figure 8:
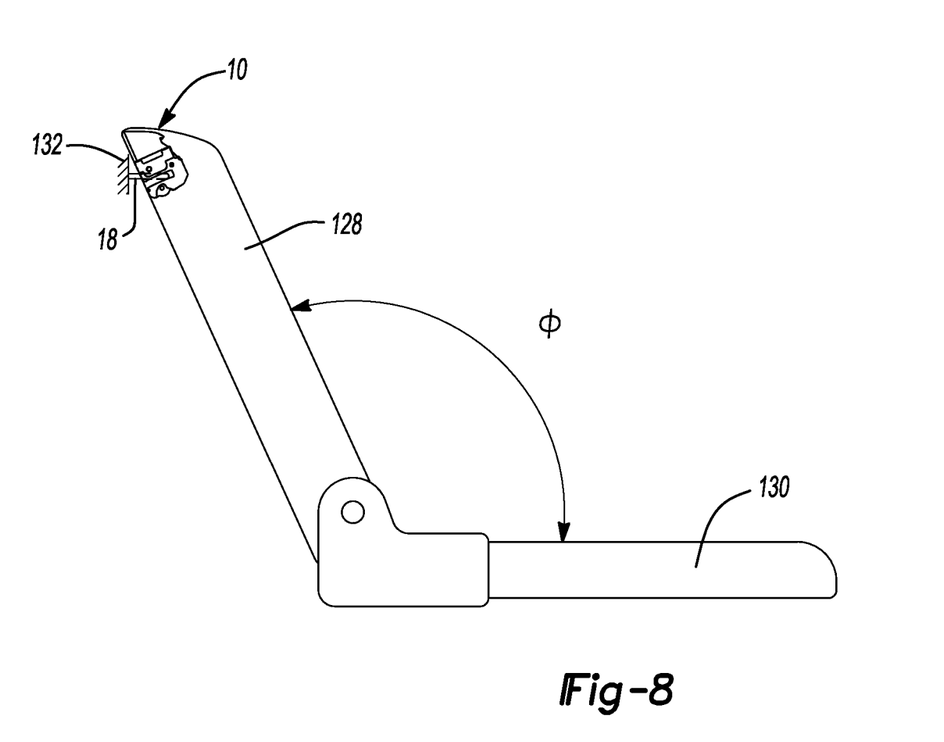
FIG. 8 is a perspective view of the seat assembly of FIG. 6 showing a seatback of the seat assembly in a second angular position relative to a seat bottom.

With reference to the figures, a latch mechanism 10 is provided and includes a housing 12, a locking mechanism 14, and an actuation mechanism 16. The housing 12 supports the locking mechanism 14 relative to the actuation mechanism 16 and selectively receives a striker 18 associated with a vehicle 20 (FIGS. 6-8). The locking mechanism 14 selectively locks a position of the housing 12 relative to the striker 18 to fix the housing 12 relative to the striker 18 and, thus, relative to the vehicle 20. The locking mechanism 14 may lock the striker 18 relative to the housing 12 in one of a first position shown in FIG. 4 and a second position shown in FIG. 5. The actuation mechanism 16 is likewise attached to the housing 12 and selectively moves the locking mechanism 14 between a locked state (FIGS. 4 and 5) and an unlocked state (FIG. 3).

The housing 12 includes a first plate 22, a second plate 24, and a channel 26 defined by the first plate 22 and the second plate 24. Namely, the first plate 22 includes a slot 28 that aligns with a slot 30 of the second plate 24 to define the channel 26 when the first plate 22 is attached to the second plate 24. The first plate 22 is attached to the second plate 24 by a first pivot 32 and a second pivot 34. The first pivot 32 is received by an attachment aperture 36 of the first plate 22 and is likewise received by an attachment aperture 38 of the second plate 24 to attach the first plate 22 to the second plate 24. In so doing, a cylindrical portion 40 of the first pivot 32 is disposed generally between the first plate 22 and the second plate 24 to define a distance between the first plate 22 and the second plate 24 once assembled together.

The second pivot 34 is likewise received by an attachment aperture 42 of the first plate 22 and by an attachment aperture 44 of the second plate 24. As with the first pivot 32, the second pivot 34 likewise includes a cylindrical portion 46 that defines a distance between the first plate 22 and the second plate 24 when the first plate 22 is attached to the second plate 24.

The locking mechanism 14 is disposed generally between the first plate 22 and the second plate 24 and is moved between the locked state and the unlocked state to selectively lock a position of the striker 18 within the channel 26. The locking mechanism 14 includes a claw 48, a lock cam 50, a tolerance-absorbing cam 52, a first stop cam 54 associated with the claw 48, and a second stop cam 56 associated with the lock cam 50. The claw 48 includes an aperture 58 that receives the cylindrical portion 40 of the first pivot 32 to rotationally support the claw 48 between the first plate 22 and the second plate 24. The claw 48 additionally includes a channel 60 defined by a pair of arms 62, 64. Finally, the claw 48 includes a first locking recess 66 defined at least in part by the arm 62 and a second locking recess 68 spaced apart from the first locking recess 66.

The lock cam 50 includes an elongated aperture 70, a locking projection 72, and a release arm 74. The lock cam 50 additionally includes an attachment aperture 76 that receives a pin 78. The pin 78 may be staked to the lock cam 50 at the attachment aperture 76. While the pin 78 is described as being staked to the lock cam 50 at the attachment aperture 76, the pin 78 could be attached to the lock cam 50 in virtually any manner that causes the pin 78 to be fixed for movement with the lock cam 50. For example, the pin 78 could be integrally formed with the lock cam 50 such that the need for the attachment aperture 76 is obviated.

The lock cam 50 is supported by the second pivot 34 such that the elongated aperture 70 receives the cylindrical portion 46 of the second pivot 34 to slidably support the lock cam 50 between the first plate 22 and the second plate 24. The elongated aperture 70 of the lock cam 50 is larger than the cylindrical portion 46 and, in one configuration, includes a substantially oval shape. The oval shape of the elongated aperture 70 allows the lock cam 50 to axially translate relative to and between the first plate 22 and the second plate 24 while concurrently being constrained by the cylindrical portion 46 of the second pivot 34. As will be described below, providing the lock cam 50 with the elongated aperture 70 allows the tolerance-absorbing cam 52 to translate the lock cam 50 relative to and between the first plate 22 and the second plate 24 to account for tolerances amongst the various components of the housing 12, the locking mechanism 14, the actuation mechanism 16, and the striker 18, thereby minimizing relative movement of the components of the housing 12, the locking mechanism 14, the actuation mechanism 16, and the striker 18 and any noise associated therewith.

The tolerance-absorbing cam 52 includes an aperture 80, a projection 82, and a slot 84. The aperture 80 rotatably receives the cylindrical portion 46 of the second pivot 34 such that the tolerance-absorbing cam 52 is rotatably supported between the first plate 22 and the second plate 24 by the second pivot 34. The projection 82 extends from the tolerance-absorbing cam 52 and interacts with the actuation mechanism 16 to move the locking mechanism 14 from the locked state (FIGS. 4 and 5) to the unlocked state (FIG. 3) and, further, to permit the striker 18 to move from a first locked state shown in FIG. 4 to a second locked state shown in FIG. 5.

The slot 84 includes a generally arcuate shape having a first end 86 and a second end 88. The slot 84 slidably receives the pin 78 of the lock cam 50 to allow the tolerance-absorbing cam 52 to move the lock cam 50 relative to and between the first plate 22 and the second plate 24. Further, the slot 84 cooperates with the pin 78 and the actuation mechanism 16 to move the locking mechanism 14 from the locked state to the unlocked state, as will be described in detail below.

Figure 4:
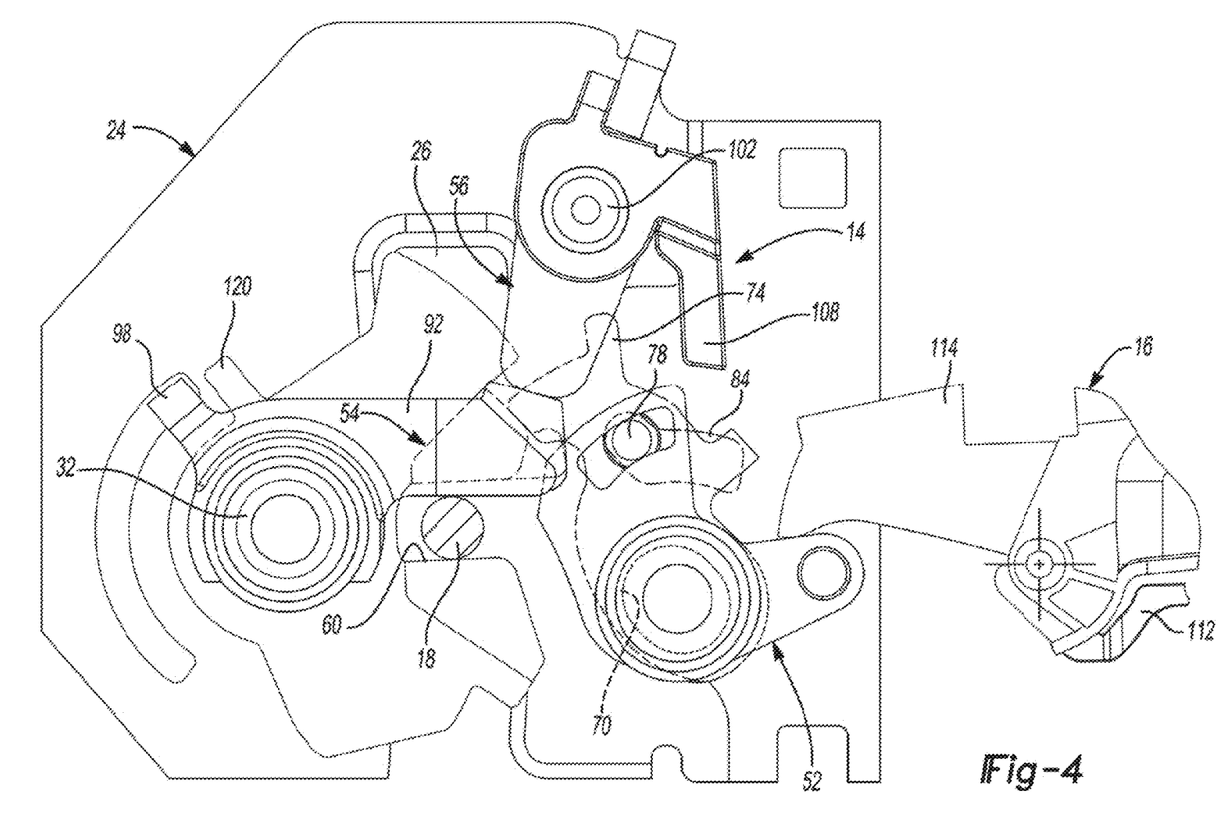
FIG. 4 is a perspective view of the latch mechanism of FIG. 1 with part of a housing removed to show internal components of the latch mechanism in a first locked state.

The first stop cam 54 includes a bearing surface 90, a lock arm 92 having a first engagement surface 94 and a second engagement surface 96. The bearing surface 90 is rotatably attached to the cylindrical portion 40 of the first pivot 32 such that the first stop cam 54 is rotatably supported by the first pivot 32 between the first plate 22 and the second plate 24 and rotates about the bearing surface 90. The lock arm 92 extends from the bearing surface 90, whereby the first engagement surface 94 is formed along a length thereof and the second engagement surface 96 is disposed generally on an opposite side of the lock arm 92 from the first engagement surface 94. As shown in FIGS. 3-5, the engagement surface 96 is formed at an angle relative to a longitudinal axis of the lock arm 92 to allow the engagement surface 96 to properly receive the second stop cam 56.

The second stop cam 56 includes an aperture 100 that rotatably receives a pivot 102. The pivot 102 rotatably supports the second stop cam 56 between the first plate 22 and the second plate 24. The second stop cam 56 additionally includes a lock arm 104 having an engagement surface 106. The lock arm 104 selectively engages the lock arm 92 of the first stop cam 54 to maintain a position of the striker 18 between the claw 48 and the first stop cam 54, as shown in FIG. 4. The release arm 108 of the second stop cam 56 selectively receives the release arm 74 of the lock cam 50 to disengage the lock arm 104 of the second stop cam 56 from the engagement surface 96 of the first stop cam 54, thereby allowing the first stop cam 54 to rotate in the counterclockwise direction relative to the view shown in FIG. 5 along with the claw 48.

The actuation mechanism 16 is supported by the housing 12 and selectively moves the locking mechanism 14 from the locked state to the unlocked state. The actuation mechanism 16 includes a housing 110, an actuation handle 112, and a release lever 114. The release lever 114 is fixed for movement with the actuation handle 112 such that when a force is applied to the actuation handle 112 to rotate the actuation handle 112 relative to the housing 110, the release lever 114 is similarly rotated relative to the housing 110. As will be described below, rotation of the release lever 114 relative to the housing 110 causes the release lever 114 to contact the tolerance-absorbing cam 52 at the projection 82, thereby rotating the tolerance-absorbing cam 52 relative to the first plate 22 and the second plate 24 and moving the locking mechanism 14 from the locked state to the unlocked state.

With particular reference to FIGS. 3-5, operation of the latch mechanism 10 will be described in detail. When the latch mechanism 10 is in the unlocked state shown in FIG. 3, an opening of the channel 60 of the claw 48 is open to the channel 26 of the housing 12. Accordingly, when the housing 12 is moved toward the striker 18, the striker 18 is received by the channel 26 of the housing 12 and by the channel 60 of the claw 48.

Upon sufficient movement of the housing 12 relative to the striker 18, the striker 18 engages the claw 48 within the channel 60, thereby causing the claw 48 to rotate against the bias imparted on the claw 48 by a biasing member 116 and in the counterclockwise direction relative to the view shown in FIG. 3. Rotation of the claw 48 in the counterclockwise direction relative to the view shown in FIG. 3 causes the claw 48 to move into the position shown in FIG. 4, as the striker 18 continues to rotate the claw 48. The claw 48 continues to rotate in the counterclockwise direction until the striker 18 contacts the engagement surface 94 of the lock arm 92 of the first stop cam 54.

At this point, further movement of the housing 12 relative to the striker 18 is prevented due to engagement between the striker 18 and the lock arm 92 of the first stop cam 54. The first stop cam 54 is prevented from rotating in the counterclockwise direction relative to the view shown in FIG. 4 due to engagement between the second engagement surface 96 of the lock arm 92 and the engagement surface 106 of the lock arm 104. The claw 48 is maintained in the position shown in FIG. 4 due to engagement between the lock cam 50 and the first locking recess 66 of the claw 48.

The lock cam 50 is biased in the counterclockwise direction relative to the view shown in FIG. 4 by a biasing member 118, which imparts a rotational force on the lock cam 50 via the tolerance-absorbing cam 52. Namely, the biasing member 118 exerts a biasing force on the tolerance-absorbing cam 52 in the counterclockwise direction relative to the view shown in FIG. 4 which, in turn, causes the tolerance-absorbing cam 52 to move in the counterclockwise direction.

Movement of the tolerance-absorbing cam 52 in the counterclockwise direction relative to the view shown in FIG. 4 causes the pin 78 of the lock cam 50 to traverse the slot 84 of the tolerance-absorbing cam 52 such that the second end 88 of the slot 84 moves closer to the pin 78. In so doing, a force is exerted on the lock cam 50 via the pin 78, thereby causing the lock cam 50 to translate relative to the second pivot 34. Translation of the lock cam 50 relative to the second pivot 34 is accomplished via the elongated aperture 70 of the lock cam 50, as the elongated aperture 70 of the lock cam 50 includes a substantially oval shape having a length that is greater than an outer diameter of the cylindrical portion 46 of the second pivot 34.

Translation of the lock cam 50 relative to and between the first plate 22 and the second plate 24 causes the lock cam 50 to positively engage the first locking recess 66 of the claw 48, regardless of any tolerances amongst the various components of the housing 12, the locking mechanism 14, the actuation mechanism 16, and the striker 18. Namely, the pin 78 may be disposed within the slot 84 anywhere between the first end 86 and the second end 88. The exact location of the pin 78 within the slot 84 between the first end 86 and the second end 88 is largely determined by the tolerances of the various components of the housing 12, the locking mechanism 14, the actuation mechanism 16, and the striker 18. For example, if the tolerances amongst the various components 12, 14, 16, 18 are held to a tight tolerance, the pin 78 will be disposed within the slot 84 closer to the first end 86 than the second end 88 when compared to a setup having more relaxed tolerances for the various components 12, 14, 16, 18.

When tolerances amongst the various components 12, 14, 16, 18 are relaxed, the pin 78 will likely be required to traverse the slot 84 a greater degree from the first end 86 to the second end 88 to account for the greater variance in tolerances amongst the components 12, 14, 16, 18. Regardless of the tolerances of the components 12, 14, 16, 18, the pin 78 will be located within the slot 84 until positive engagement between the locking projection 72 of the lock cam 50 and the first locking recess 66 of the claw 48 is achieved. Once achieved, the striker 18 is locked between the arm 64 of the claw 48 and the lock arm 92 of the first stop cam 54. This position of the striker 18 is shown in FIG. 4 and establishes the first locked position of the locking mechanism 14 and the first locked position of the striker 18.

The striker 18 may move further into the channel 26 if the locking mechanism 14 is moved from the locked state to the unlocked state via the actuation mechanism 16. Namely, if a force is subsequently applied to the release handle 112 of the actuation mechanism 16 such that the release lever 114 is rotated and once again causes rotation of the tolerance-absorbing cam 52 in the clockwise direction relative to the view shown in FIG. 4, the pin 78 traverses the slot 84 and moves toward the first end 86. Upon sufficient rotation of the tolerance-absorbing cam 52 in the clockwise direction relative to the view shown in FIG. 4, the pin 78 contacts the first end 86 of the slot 84, thereby causing the pin 78 and, thus, the lock cam 50, to rotate with the tolerance-absorbing cam 52 in the clockwise direction relative to the view shown in FIG. 4.

Rotation of the lock cam 50 in the clockwise direction relative to the view shown in FIG. 4 causes the locking projection 72 of the lock cam 50 to disengage the first locking recess 66 of the claw 48, thereby permitting rotation of the claw 48 in the counterclockwise direction relative to the view shown in FIG. 4. Rotation of the claw 48 in the counterclockwise direction is accomplished due to interaction between the striker 18 and the arm 62 of the claw 48.

The striker 18 is permitted to contact the arm 62 of the claw 48, as the second stop cam 56 is rotated out of engagement with the first stop cam 54 by the lock cam 50. Namely, as the lock cam 50 is rotated in the clockwise direction relative to the view shown in FIG. 4, the release arm 74 of the lock cam 50 contacts the release arm 108 of the second stop cam 56, thereby causing the second stop cam 56 to rotate in the counterclockwise direction relative to the view shown in FIG. 4. Rotation of the second stop cam 56 in the counterclockwise direction relative to the view shown in FIG. 4 causes the engagement surface 106 of the lock arm 104 to disengage the engagement surface 96 of the lock arm 92, thereby allowing the first stop cam 54 to rotate in the counterclockwise direction relative to the view shown in FIG. 4.

Rotation of the first stop cam 54 in the counterclockwise direction relative to the view shown in FIG. 4 is caused by the housing 12 being moved relative to the striker 18 such that the striker 18 is caused to move further into the channel 26. The force exerted on the first stop cam 54 by the striker 18 causes the first stop cam 54 to rotate in the counterclockwise direction relative to the view shown in FIG. 4. The striker 18 contacts the claw 48 upon sufficient movement of the housing 12 relative to the striker 18, thereby causing the claw 48 to rotate in the counterclockwise direction relative to the view shown in FIG. 4 under the force imparted thereon by the striker 18. Engagement between a projection 120 of the claw 48 and the release arm 98 of the first stop cam 54 causes the first stop cam 54 to rotate along with the claw 48. Once the claw 48 and the first stop cam 54 are rotated into the position shown in FIG. 5, the striker 18 is permitted to fully move into the housing 12 and contact the housing 12 at a surface 122.

At this point, further movement of the housing 12 relative to the striker 18 is not permitted. The claw 48 is held in the position shown in FIG. 5 due to engagement between the locking cam 50 and the claw 48. Namely, the locking projection 72 of the lock cam 50 is received within the second locking recess 68 of the claw 48, thereby preventing the claw 48 from being rotated in the clockwise direction relative to the view shown in FIG. 5. Accordingly, the striker 18 is concurrently held in engagement with the claw 48 and with the surface 122 of the housing 12.

As described above with respect to the first locked state, the second locked state (FIG. 5) is achieved and maintained by the lock cam 50. Again, the lock cam 50 accounts for any tolerances amongst the various components 12, 14, 16, 18 due to its association with the tolerance-absorbing cam 52, which causes the lock cam 50 to translate relative to and between the first plate 22 and the second plate 24 until the locking projection 72 is properly seated within the second locking recess 68 and the claw 48 is in contact with the striker 18. Accordingly, the lock cam 50 cooperates with the tolerance-absorbing cam 52 to ensure that the striker 18 is concurrently in contact with the claw 48 and with the surface 122 of the housing 12.

The striker 18 may be released from the housing 12 by moving the locking mechanism from the locked state (FIG. 5) to the unlocked state (FIG. 3). A force may be once again applied to the tolerance-absorbing cam 52 at the projection 82, thereby causing the tolerance-absorbing cam 52 to rotate in the clockwise direction relative to the view shown in FIG. 5. Sufficient rotation of the tolerance-absorbing cam 52 in the clockwise direction relative to the view shown in FIG. 5 causes the pin 78 to contact the first end 86 of the slot 84, thereby causing the lock cam 50 to rotate in the clockwise direction relative to the view shown in FIG. 5 along with the tolerance-absorbing cam 52. Upon sufficient rotation of the lock cam 50 in the clockwise direction relative to the view shown in FIG. 5, the lock cam 50 disengages the second locking recess 68 of the claw 48, thereby allowing the claw 48 to rotate in the clockwise direction along with the lock cam 50.

The claw 48 rotates in the clockwise direction relative to the view shown in FIG. 5 due to the force imparted thereon by the biasing member 116. Once the claw 48 is permitted to rotate in the clockwise direction relative to the view shown in FIG. 5, the housing 12 is once again permitted to move relative to the striker 18 such that the surface 122 of the housing 12 moves away from the striker 18. Once the claw 48 is returned to the position shown in FIG. 3, the housing 12 may be completely disconnected from the striker 18 such that no portion of the striker 18 is disposed within the channel 28 of the housing 12. The claw 48 and the first stop cam 54 returns to the position shown in FIG. 3 due to the forces imparted thereon via the biasing member 116. Similarly, the tolerance-absorbing cam 52 is returned to the position shown in FIG. 3 due to the forces imparted thereon by the biasing member 118. Finally, the second stop cam 56 is returned to the position shown in FIG. 3 due to the forces exerted thereon by a biasing member 124.

With particular reference to FIGS. 6-8, the latch mechanism 10 is shown incorporated into a seat assembly 126 having a seatback 128 rotatably supported by a seat bottom 130. The latch mechanism 10 may be located proximate to a top portion of the seat assembly 126 such that the latch mechanism 10 is fixed for rotation with the seatback 128 relative to the seat bottom 130. In a fold-flat position shown in FIG. 6, the seatback 128 is substantially parallel to the seat bottom 130 and the latch mechanism 10 is completely disconnected from the striker 18. In the configuration shown in FIG. 6, the striker 18 is shown as being attached to structure 132 of a vehicle.

A force may be applied to the seatback 128 to rotate the seatback 128 from the fold-flat position shown in FIG. 6 to an upright position shown in FIG. 7. The seatback 128 may be retained in the upright position when the striker 18 is received by the channel 26 of the housing 12. In this position, the force exerted on the claw 48 by the striker 18 causes the latch mechanism 10 to move into the first locked state shown in FIG. 3. When the locking mechanism 14 is in the first locked state, the seatback 128 is fixed to the striker 18 such that an angular position ($\beta$) of the seatback 128 is fixed relative to the seat bottom 130.

The seatback 128 may be further reclined from the position shown in FIG. 7 to the position shown in FIG. 8 by applying a force on the release lever 114 of the actuation mechanism 116. Namely, and as described above, rotating the actuation handle 112 causes the release lever 114 of the actuation mechanism 116 to move the locking mechanism 14 from the locked state to the unlocked state due to the interaction between the release lever 114 and the tolerance-absorbing cam 52. Once the locking mechanism 14 is moved from the locked state to the unlocked state, the seatback 128 may be reclined an additional five to ten degrees (5°-10°) relative to the seat bottom 130 to another angular position ($\phi$), whereby ($\phi$) is a greater angle than ($\beta$). The seatback 128 may be moved relative to the seat bottom 130 until the striker 18 contacts the surface 122 of the housing 12. At this point, the locking mechanism 14 returns to the locked state and the striker 18 is retained within the housing 12 and is concurrently in contact with the claw 48 and the hosing 12.

With reference to FIGS. 4 and 5, the striker 18 is positively retained between two elements of the latch mechanism 10 when in either the first locked state or the second locked state. Namely, in the first locked state (FIG. 4), the striker 18 is retained between the arm 64 of the claw 48 and the first stop cam 54. Similarly, the striker 18 is retained between the claw 48 and the surface 122 of the housing 12 in the second locked state (FIG. 5). Accordingly, should a force be applied to the housing 12 along a longitudinal axis of the channel 26 in either direction, such a force is directly translated to the striker 18 and relative movement between the housing 12 and the striker 18 is not be permitted.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch mechanism that selectively receives a striker, the latch mechanism comprising:
   a housing having a channel; and
   a locking mechanism including a claw rotatably supported by the housing and movable between a first locked state and a second locked state, the claw locking the striker at a first location along a length of the channel in the first locked state and locking the striker at a second location along a length of the channel different than the first location in the second locked state,
   wherein the locking mechanism includes a lock cam mounted for rotation relative to the housing and engaging the claw in the first locked state to restrict rotation of the claw relative to the housing,
   wherein the locking mechanism includes a tolerance-absorbing cam mounted for rotation relative to the housing and including a slot receiving a pin of the lock cam.

2. The latch mechanism of claim 1, wherein the claw is in a first rotational position in the first locked state and a second rotational position in the second locked state.

3. The latch mechanism of claim 2, wherein the locking mechanism includes a first stop cam mounted for rotation relative to the housing and selectively restricting movement of the striker from the first location along the length of the channel to the second location along the length of the channel.

4. The latch mechanism of claim 3, wherein the lock cam includes a locking projection that engages a first locking recess in the claw in the first locked state and engages a second locking recess in the claw in the second locked state.

5. The latch mechanism of claim 3, wherein the locking mechanism includes a second cam stop mounted for rotation relative to the housing and engaging the first cam stop in the first locked state to restrict rotation of the first cam stop relative to the housing.

6. The latch mechanism of claim 5, further comprising a release lever mounted for rotation relative to the housing and engaging the tolerance-absorbing cam such that rotation of the release lever causes corresponding rotation of the tolerance-absorbing cam, wherein rotation of the tolerance-absorbing cam causes rotation of the lock cam.

7. The latch mechanism of claim 5, wherein the claw and the first cam stop are rotatable about a first pivot, wherein the lock cam and the tolerance-absorbing cam are rotatable about a second pivot that is spaced apart from the first pivot, and wherein the second cam stop is rotatable about a third pivot that is spaced apart from the first and second pivots.

8. The latch mechanism of claim 1, wherein the claw includes a claw channel in which the striker is received in the first locked state, and wherein the striker is outside of the claw channel in the second locked state.

9. A seat assembly comprising:
a seat bottom;
a seatback that is rotatable relative to the seat bottom among a fold-flat position, a first upright position and a second upright position; and
a latch mechanism mounted to an upper portion of the seatback and receiving a striker in the first and second upright positions, the latch mechanism including a housing and a locking mechanism, the housing including a channel, the locking mechanism including a claw rotatably supported by the housing and movable between a first locked state and a second locked state, the claw locking the striker at a first location along a length of the channel in the first locked state and locking the striker at a second location along a length of the channel different than the first location in the second locked state,
wherein the seatback is locked in the first upright position when the locking mechanism is in the first locked state, and the seatback is locked in the second upright position when the locking mechanism is in the second locked state,
wherein the locking mechanism includes a lock cam mounted for rotation relative to the housing and engaging the claw in the first locked state to restrict rotation of the claw relative to the housing,
wherein the lock cam includes a locking projection that engages a first locking recess in the claw in the first locked state and engages a second locking recess in the claw in the second locked state.

10. The seat assembly of claim 9, wherein the claw is in a first rotational position in the first locked state and a second rotational position in the second locked state.

11. The seat assembly of claim 10, wherein the locking mechanism includes a first stop cam mounted for rotation relative to the housing and selectively restricting movement of the striker from the first location along the length of the channel to the second location along the length of the channel.

12. The seat assembly of claim 11, wherein the locking mechanism includes a tolerance-absorbing cam mounted for rotation relative to the housing and including a slot receiving a pin of the lock cam.

13. The seat assembly of claim 12, wherein the locking mechanism includes a second cam stop mounted for rotation relative to the housing and engaging the first cam stop in the first locked state to restrict rotation of the first cam stop relative to the housing.

14. The seat assembly of claim 13, wherein the latch mechanism includes a release lever mounted for rotation relative to the housing and engaging the tolerance-absorbing cam such that rotation of the release lever causes corresponding rotation of the tolerance-absorbing cam, wherein rotation of the tolerance-absorbing cam causes rotation of the lock cam.

15. The seat assembly of claim 13, wherein the claw and the first cam stop are rotatable about a first pivot, wherein the lock cam and the tolerance-absorbing cam are rotatable about a second pivot that is spaced apart from the first pivot, and wherein the second cam stop is rotatable about a third pivot that is spaced apart from the first and second pivots.

16. The seat assembly of claim 9, wherein the claw includes a claw channel in which the striker is received in the first locked state, and wherein the striker is outside of the claw channel in the second locked state.

17. A latch mechanism that selectively receives a striker, the latch mechanism comprising:
a housing having a channel; and
a locking mechanism including a claw rotatably supported by the housing and movable between a first locked state and a second locked state, the claw locking the striker at a first location along a length of the channel in the first locked state and locking the striker at a second location along a length of the channel different than the first location in the second locked state,
wherein the locking mechanism includes a lock cam mounted for rotation relative to the housing and engaging the claw in the first locked state to restrict rotation of the claw relative to the housing,
wherein the lock cam includes a locking projection that engages a first locking recess in the claw in the first locked state and engages a second locking recess in the claw in the second locked state.

18. The latch mechanism of claim 17, wherein the claw is in a first rotational position in the first locked state and a second rotational position in the second locked state, wherein the locking mechanism includes a first stop cam mounted for rotation relative to the housing and selectively restricting movement of the striker from the first location to the second location along the length of the channel.

19. The latch mechanism of claim 18, wherein the locking mechanism includes a second cam stop mounted for rotation relative to the housing and engaging the first cam stop in the first locked state to restrict rotation of the first cam stop relative to the housing.

20. The latch mechanism of claim 19, further comprising a release lever mounted for rotation relative to the housing and engaging a tolerance-absorbing cam of the locking mechanism such that rotation of the release lever causes corresponding rotation of the tolerance-absorbing cam, wherein rotation of the tolerance-absorbing cam causes rotation of the lock cam.

21. The latch mechanism of claim 20, wherein the claw and the first cam stop are rotatable about a first pivot, wherein the lock cam and the tolerance-absorbing cam are rotatable about a second pivot that is spaced apart from the first pivot, and wherein the second cam stop is rotatable about a third pivot that is spaced apart from the first and second pivots.

22. The latch mechanism of claim 21, wherein the claw includes a claw channel in which the striker is received in the first locked state, and wherein the striker is outside of the claw channel in the second locked state.

23. The latch mechanism of claim 22, wherein the tolerance-absorbing cam mounted for rotation relative to the housing and including a slot receiving a pin of the lock cam.

\* \* \* \* \*